United States Patent

Faber

[11] 4,052,112
[45] Oct. 4, 1977

[54] PISTON SEAL
[75] Inventor: Klaus Faber, Manchester, N.H.
[73] Assignee: Disogrin Industries, Inc., Manchester, N.H.
[21] Appl. No.: 687,387
[22] Filed: May 14, 1976
[51] Int. Cl.² .............................................. F16J 15/24
[52] U.S. Cl. .................................. 308/3.5; 277/188 A
[58] Field of Search ............................. 308/3.5, 36.1; 277/188 R, 188 A, 177; 92/168

[56] References Cited
U.S. PATENT DOCUMENTS

| 3,394,939 | 7/1968 | Mastro | 277/188 R X |
| 3,930,657 | 1/1976 | Svensson et al. | 277/188 A |

Primary Examiner—Philip Goodman
Assistant Examiner—Gene A. Church
Attorney, Agent, or Firm—Pennie & Edmonds

[57] ABSTRACT

A seal assembly for use on a piston having a piston seal groove with spaced shoulders formed therein comprising a deformable sealing ring adapted to be maintained in the groove and having inner and outer peripheral sealing portions, and side surfaces, the sealing ring is comprised of a homogeneous thermosetting elastomeric material having a relatively high shear modulus and being wear, tear, and abrasion resistant; and a pair of unitary bearing means, each of which is juxtaposed opposite the side surfaces of the sealing ring and is made of a wear-resistant material which is harder than the material of the sealing ring. Each of the bearing means includes bearing section means and support section means. The bearing section means is adapted to be seated on a corresponding shoulder formed in the piston groove for providing a bearing support for said seal assembly, and the support section means contacts the sealing ring and includes generally concave surface means which generally conform to at least portions of the side surfaces of the sealing ring for preventing extrusion and twisting of the sealing ring.

12 Claims, 2 Drawing Figures

PISTON SEAL

BACKGROUND OF THE INVENTION

1. Field of the Invention

The present invention pertains, in general, to a seal assembly for pistons and the like. More particularly, it relates to a novel and improved three-piece seal assembly especially adapted for use in sealing large clearances existing in piston-cylinder assemblies and which essentially includes a novel and improved elastomeric sealing ring and a pair of novel and improved bearing members associated and cooperating with opposite sides of the sealing ring.

2. Description of the Prior Art

In industry, it is rather conventional practice to protect against uncontrolled fluidic leakage through the application of seals and seal assemblies. One particular type of application in which the prevention of undesired leakage of fluid is highly desirable is in standard fluid cylinders, especially in high pressure situations. A rather typical type of fluid basically includes a piston cylinder wall and slidably disposed therein a movable piston. The piston usually has a seal or seal assembly mounted on the external periphery thereof. Normally fluidized pressure is introduced into the cylinder for purposes of advancing the piston. The seal serves to enhance such advancement by substantially blocking passage of all but a small amount of fluid which would otherwise have a tendency to pass around the periphery of the piston. Thereby, a more efficient utilization of fluid power is obtained. Additionally, to further minimize the tendency of unwanted fluid leakage about the piston, it is customary to have the corresponding piston cylinder walls rather accurately machined within close tolerances of the piston. In this particular manner, through the close radial tolerances, there is less likelihood that unwanted leakage will occur.

Heretofore, in the prior art there have been many kinds of piston seals and seal assemblies which are constructed and arranged in a wide variety of ways and from different types of materials.

Since the seal is crucial in the successful functioning of fluid cylinders, it is extremely important that material characteristics, such as hardness, modulus of the material, abrasion resistance, tear strength and compatibility with various materials be selected in conjunction with the particular design configuration of the seal to achieve such successful operation. In general, while in given circumstances certain seal assemblies perform rather adequately, there are, however, many situations wherein such assemblies suffer serious disadvantages. One of the primary disadvantages ordinarily associated with the use of many of these known types of sealing rings, especially under high fluid pressure applications, is extrusion. Extrusion normally occurs whenever the O-ring or other sealing ring is forced between the rather small radial clearance or tolerance existing between the piston and the internal peripheral wall portion of the corresponding cylinder. As a consequence, the material of the sealing ring has a tendency to be extruded and will be abraded or sheared off during the normal relative movement between the piston and the cylinder wall. It will be appreciated in those circumstances where the radial clearance is larger than normal, the tendency for extrusion is correspondingly increased. In such event, the seal tends to be rendered unsuitable for the purposes intended.

Another similar disadvantage which frequently arises in the field is the fact that the sealing elements or O-rings and the like have the tendency to roll or twist. Rolling or twisting tends to cause these sealing elements or O-rings to split and otherwise break. It is evident that such results will likewise render them unsuitable for the purposes intended.

Still another shortcoming in this field is the somewhat commmon practice to machine the internal peripheral cylinder wall to a close tolerance with respect to the piston. Since in commercial practice such tolerances must be rather accurately machined, such, of course, necessarily results in the undesirable feature of increased manufacturing costs. In an effort to overcome this particular cost problem, manufacturers of fluid cylinders and seals have tended to machine cylinder walls so that they have relatively large tolerances with respect to the piston. At this point, it should be emphasized that the field of fluid cylinders, seals and sealing assemblies is extremely competitive and there is somewhat of a narrow or small profit margin associated with the sales of such fluid cylinder seals and sealing assemblies. As a consequence thereof, it will, of course, be appreciated that even slight increases in costs may render such fluid cylinders and corresponding seals and sealing assemblies commercially less desirable than competing cylinders, seals and sealing assemblies. In addition, as earlier mentioned with greater tolerances or clearance the likelihood for extrusion of the sealing element as well as rolling and twisting of the same is increased. Accordingly, many conventional sealing assemblies were found to be unsuitable for use in those situations wherein larger tolerances existed especially at high pressures. In particular, under the foregoing conditions, these known seals and sealing assemblies do not possess adequate relationships between high shear modulus, high abrasion resistance, high tear strength and compatability with many fluids to successfully operate as well as be economical to manufacture. Additionally, traditional design configurations for primary sealing members have, under the above circumstances, in general, been unsatisfactory. Moreover, such seals and sealing assemblies are either complicated in construction and/or relatively expensive to produce.

Conventional O-rings and the like which are fabricated from rubber are not found to exhibit suitable wear, tear, and abrasion resistance characteristics as well as possess high modulus of material for ordinary temperature ranges at particular hardnesses, especially under high fluid pressure applications wherein relatively large clearances exist between the piston and corresponding cylinder wall. As a result, such O-rings and the like have a relatively short seal life. Therefore, frequent maintenance and replacement are required. Aside from these deficiencies, the conventional rubber O-rings suffer from other shortcomings in that they are normally manufactured through a compression molding process. Compression molding produces sealing elements that have seams. Such seams must be relatively smooth and continuous. This unnecessarily adds to manufacturing cost factors. Additionally, conventional rubber O-rings are generally incapable of being fabricated such that they can advantageously accommodate for large extrusion gaps since they do not possess adequate strength and performance characteristics.

Besides rubber, there are other heretofore known materials which have been employed to form sealing elements. Teflon, Kel-F and Nylon are examples of such sealing materials. These other materials, however, have been found not to be satisfactory, particularly from the standpoint of having a reliable, long-wearing sealing ring used in applications having relatively large clearances and high fluidic pressures. Moreover, both Teflon and Kel-F are the kinds of materials which are basically non-elastomeric as well as are thermoplastic. Additionally, this latter group of materials is subject to cold flow problems which renders them less effective for sealing purposes. Nylon is also relatively unsuitable for sealing purposes since it is basically a rigid plastic of the thermoplastic type. Polyurethane has been previously used as a material for certain types of seal rings, but it has not been used other than as a relatively conventional sized and shaped O-ring or other conventional sized and shaped seal.

Furthermore, several known prior art sealing constructional arrangements for pistons suffer from the disadvantages of being extremely complex and expensive to manufacture. By way of specific example, one particular type of known sealingassembly is comprised of five separate and distinct components. Included in this assembly is an oversized rubber sealing element having an enlarged cross-sectional area, a pair of disc-shaped back-up rings on opposite sides of such sealing element, and a pair of separate bearing rings, each disposed adjacent a respective back-up ring. Significant disadvantages are associated with this arrangement since with the large number of components, such assembly is expensive to produce and complicated in construction. Additionally, such back-up rings are unable to prevent both extrusion and rolling. Moreover, the primary sealing element is fabricated from rubber and is subject to the numerous aforementioned shortcomings associated with rubber O-rings and the like.

There have been other seal assemblies proposed which reduce cost by reducing the total number of sealing components. An example of such type of sealing assembly is a three-piece arrangement generally referred to as a Simko seal. This particular sealing arrangement includes two bearing rings and a composite seal member. Such a seal assembly, however, in order to satisfactorily perform must have extremely close and fine metal tolerances and, therefore, quite expensive surface finishes. Of course, such arrangement is expensive to produce. Additionally, the sealing element is expensive to produce, since it requires an embedded elastomeric seal element surrounded by a special rubber and fabric composite casing. It will be recognized, of course, that not only is this composite rubber seal member subject to the disadvantages previously mentioned in regard to rubber sealing members, but also, this kind of composite seal construction is expensive to produce and machine finish. Moreover it can only be used where there are close clearances or tolerances.

Another heretofore known known of three-piece seal is basically disclosed in U.S. Pat. No. 2,728,620. In the above-referenced patent, a conventional O-ring is used in conjunction with a pair of back-up rings. Drawbacks associated with this arragement are that the conventional O-ring is subject to the disadvantages previously enumerated with respect to elastomeric rubber sealing elements, and the back-up rings fail to provide adequate bearing support surfaces for the entire seal assembly.

Still another type of known three-piece construction for a piston seal is manufactured by Dowty in Great Britain. Such seal assembly essentially includes a pair of back-up rings and a rubber primary seal of special nitrile material. Such nitrile material is expensive to manufacture and must include a filler to acquire high extrusion resistance. Moreover, this material is generally stiff and has low elongation. Similarly, as with the latter described three-piece sealing arrangement, the back-up rings do not provide for bearing supports. As a consequence, this particular arrangement as well as the others fails to furnish a seal assembly of simple, economical and reliable construction which can be successfully utilized in high pressure application with large clearances, particularly those in excess of the normal ranges.

SUMMARY OF THE INVENTION

Accordingly, it is an object of the present invention to overcome the aforenoted enumerated disadvantages arising through the use of conventional sealing assemblies by providing a simple, efficient, reliable and economical three-piece seal assembly which includes a novel and improved primary sealing element, and a pair of unitary bearing means which simultaneously serves to prevent extrusion and twisting, but also provide bearing support surfaces for the seal assembly.

Briefly, in accordance with the present invention, there is envisioned a seal assembly for use on a piston having a piston seal groove with spaced shoulders formed therein comprising a deformable sealing ring adapted to be maintained in the groove and having inner and outer peripheral sealing portions, and side surfaces, said sealing ring being comprised of a homogeneous thermosetting elastomeric material having a relatively high shear modulus and having relatively high wear, tear, and abrasion resistance, particularly with respect to conventional sealing materials; and a pair of unitary bearing means, each of which is juxtaposed opposite said side surfaces of said sealing ring and being made of wear-resistant material which is harder than said material of said sealing ring, each of said bearing means including bearing section means, and support section means, said bearing section means being adapted to be seated on a corresponding shoulder formed in the piston groove for providing a bearing support for said seal assembly, and said support section means contacting said sealing ring and including generally concave surface means which generally conform to at least portions of said side surfaces of said sealing ring for preventing extrusion and twisting of said sealing ring. In a preferred embodiment, the sealing ring is comprised of polyurethane, which has a cross-sectional diameter which is approximately twice the cross-sectional diameter of a standard rubber O-ring, having an equivalent inside diameter.

BRIEF DESCRIPTION OF THE DRAWINGS

The above, as well as other objects, features, and advantages of the present invention will become readily apparent upon a reading of a detailed description of the novel and improved seal assembly made in accordance with the principles of the present invention when viewed in conjunction with the accompanying drawing wherein like reference numerals indicate like structure throughout the several views.

DETAILED DESCRIPTION

Figure 1:
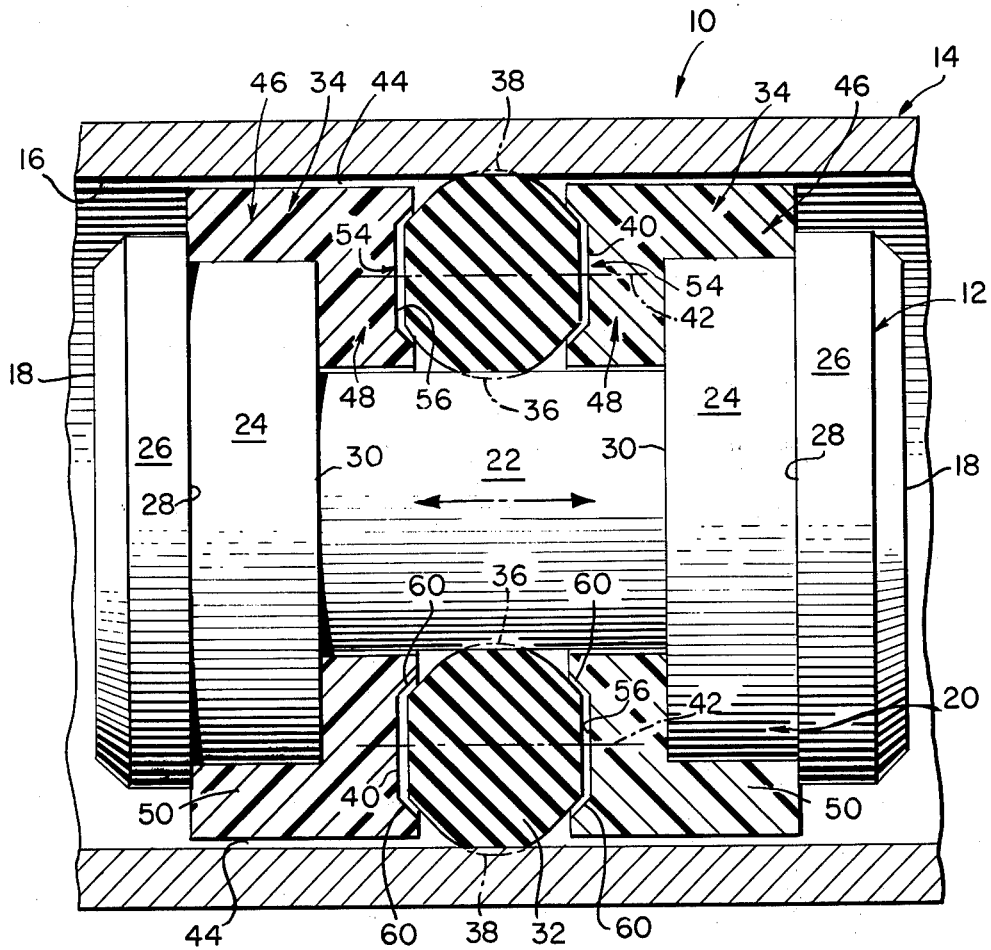
FIG. 1 is a fragmented and enlarged cross-sectional view depicting a seal assembly embodying the principles of the present invention being suitably mounted in a piston seal groove on a conventional type of piston that is slidably movable in a cooperating cylinder therefor; and, FIG. 2 is an exploded perspective view illustrating in even greater detail the various components forming the novel and improved seal assembly of this invention.
Figure 2:
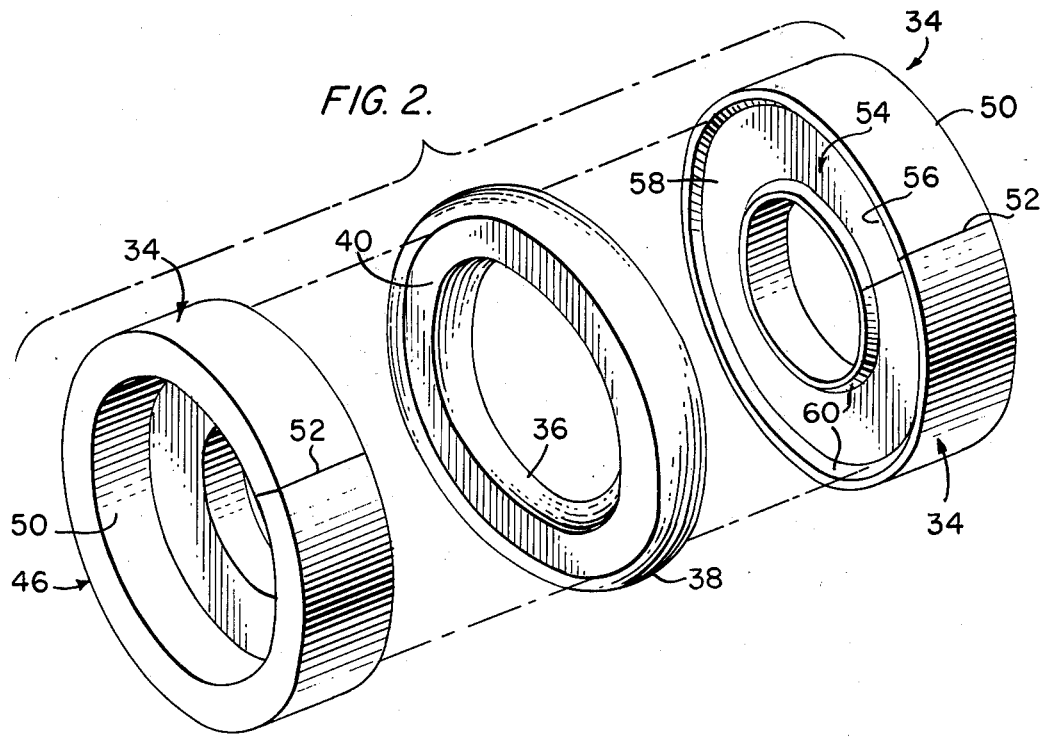

Now referring to FIGS. 1 and 2 of the drawings, there is depicted a novel and improved piston sealing assembly embodying the principles of the present invention and being generally designated by reference numeral 10. It is contemplated that this particular sealing assembly 10 may be used in conjunction with a suitably formed piston 12 which is movable with respect to fluid cylinder 14 having an internal wall 16. In the emobodiment presently beng illustrated, piston 12 is of the type which, in a conventional manner, is reciprocated in a linear back and forth motion in response to the selective application of fluid pressure on respective opposite sides 18 thereof. Although the present invention is being described in connection with a double-acting fluid cylinder, sealing assembly 10 may, of course, be used in single-acting or gravity return types of fluid cylinders and the like.

As more clearly shown in FIG. 1, piston 12 includes a conventional peripheral piston seal groove indicated by reference numeral 20. Piston seal groove 20, in a manner to be presently described, cooperates with the sealing assembly 10 so as to support and carry the latter during movement of piston 12. Basically, piston seal groove 20 comprises first annular reduced diameter section 22, a pair of spaced apart support shoulders 24, and oppostie end wall portions 26 having annular end surfaces 28. Each of the support shoulders 24 defines radial abutment surface 30.

In connection with sealing assembly 10, continued reference is made is FIGS. 1 and 2. As illustrated therein, sealing assembly 10 essentially includes primary deformable sealing ring 32, and a pair of unitary constructed bearing means or rings 34. With initial reference to the primary sealing ring 32, it will be seen to be defined by symmetrical inner and outer peripheral sealing portions or surfaces 36 and 38, respectively, and a pair of side surfaces 40 formed on opposite lateral sides thereof. Each of the inner and outer peripheral portions 36 and 38, respectively, has in the preferred embodiment, a generally circular surface and cross-sectional configuration whenever it is in its normal unflexed condition, such as shown in FIG. 2 or by the solid and dotted lines in FIG. 1. Also, in the preferred embodiment, side surfaces 40 are formed such that they are generally flat and parallel to each other. Ordinarily, the inner and outer peripheral sealing surfaces 36 and 38, respectively sealingly engage reduced diameter section 22 and internal wall 16. These inner and outer peripheral surfaces 36 and 38 serve to inhibit undesired leakage of the fluid medium around piston 12. Owing to the generally circular surface formed by the outer peripheral surface 38, there is provided a hydrodynamic lubrication film which reduces running friction about such surface.

The peripheral surfaces 36 and 38 of the present invention may have other external configurations. For instance, the sealing surfaces 36 and 38 could also be formed such that they are formed by three contingous flat areas. It has been determined, however, that the circular configuration for sealing surfaces 36 and 38 is the most desirable.

With respect to the opposed and parallel side surfaces 40, it will be further noted that in the embodiment being illustrated they are formed at substantially right angles to a horizontal axis 42 extending through the cross-sectional area of the sealing ring 32. By virtue of the flat side surfaces 40, formed as aforedescribed, there are less adverse effects, such as wedging of the sealing ring 32 or undue wear on the sealing assembly 10 which results from the radial thrust components that are detrimental to both sealing ring 32 and bearing ring 34. It will be understood, of course, that it is within the spirit and scope of the present invention that side surfaces 40 may also be formed so as to be curved. But, however, it has been recognized that if side surfaces 40 are flat there will be less wear on the sealing assembly 10.

The sealing ring 32 of the instant invention has an oversized cross-sectional area in comparison to the cross-sectional area asssociated with the conventional O-rings having the same inside diameters. Such oversized cross-sectional area of sealing ring 32 serves as a vast material reservoir by which material that is worn away through abrasion might easily be replaced. The relatively enlarged cross-sectional area sealing ring 32 can effectively serve to replace any material. For purposes of illustration and not limitation a sealing ring 32 having a cross-sectional diameter which is approximately twice that of a standard O-ring wherein both sealing ring 32 and standard O-ring have corresponding inside diameters, has been determined to provide a sealing ring with anabundant cross-sectional area that yields significantly advantageous results in comparison to the conventional O-ring. Of course, sealing ring 32 may have other cross-sectional areas so long as they are significantly proportionally larger than that for a correspondng O-ring. Preferably, however, if sealing ring 32 has a cross-sectional diameter about twice as large as the cross-sectional diameter of a standard O-ring, improved wearing results. Such large cross-sectional area is particularly important in avoiding extrusion of the material into gap 44, i.e., the clearance between cylinder wall 16 and bearing rings 34. It will be appreciated that an excessively large extrusion gap leads to significant seal failure due to extrusion or nibbling of material. In adddition, gap sizes increase with increases of pressure, since with increased pressure the cylinder walls tend to breath. Breathing occurs whenever fluid pressure is sufficient to cause radial expansion and contraction of the cylinder walls. The expansion, of course, results in increases in clearance. Additionally, thermal expansion and contraction occur which expansion results in increased clearance.

With, however, ring 32 having a cross-sectional diameter about twice as large as a standard O-ring, the adverse effects of abrasion or nibbling can be compensated for because the large material reservoir of such a ring replaces material. With the noted significantly enlarged cross-sectional area and polyurethane material, it has been determined that sealing ring 32 can satisfactorily perform in situations having a large extrusion gap, wherein such gap would otherwise cause significant seal failure if a conventionally sized seal and/or seal made of material other than polyurethane or its physical equivalent were utilized. The specific clearance or maximum extrusion gap cannot be calculated by using apparent dimension and clearances but there are, however, several known factors which play a significant part in determining such dimension. Interference for conventional O-rings with the cylinder walls is about between 1 and 5 thousandths of an inch. Of course, ring 32 can be used in those situations where larger than the foregoing interference is used. A seal made with polyurethane and otherwise made in accordance with the principles of of this invention could successfully operate without extrusion or nibbling occurring to the material should piston rod and cylinder dimensions vary by more than 1% of the specified dimensions therefor. Also, sealing ring 32 can allow between about 3 to 5 times the interference of standard O-rings. The foregoing figures are given for purposes of illustration and should not be considered limiting. Additionally, the enlarged area enables it to better adapt to cylinder walls 16 which have larger than normal clearances with respect to the piston.

The present invention envisions that sealing ring 32 be fabricated from a relatively hard, homogeneous, thermosetting elastomeric material. It has been found that polyurethane has excellent wear characteristics and is inexpensive and easy to manufacture. The preferred polyurethane should have a relatively high shear modulus which does not show large variations with temperature over a normal operating range of temperatures, for example, from 32° to 212° F. It will be understood, of course, that the shear modulus measurement determines the constancy of the radial load. This is of particular significance because the prime physical characteristic which determines the satisfactory operation of a seal is the maintenance of a proper radial load on the sealing surface. Large variations in the modulus for change in temperature adversely affect radial forces of the sealing element to the extent that an unsatisfactory sealing action occurs. In particular, such polyurethane elastomer should have a higher shear modulus with respect to temperature than rubber at the same hardness as rubber, as well as greater toughness, more resistance to tearing and better abrasion resistance than conventional elastomers. Specifically, such polyurethane could have about five times the tear resistance of natureal rubber or about six times that for nitrile at about the same hardness. As can be appreciated, since tearing is one of the major causes of seal failure, polyurethane provides enhanced sealing improvements. Additionally, such polyurethane could have about three times higher abrasion resistance than rubber or about four times higher than nitrile material, at about the same hardness. Also, the improved abrasion resistance of polyurethane considerably prolongs life. Accordingly, the polyurethane provides an optimum balance of high shear modulus, high abrasion resistance, high tear strength and compatibility with other materials. Thus, an improved operating seal life with high reliability is provided.

Also, the polyurethane sealing ring 32 besides being able to easily conform to the internal configurations of the cylinder 16, is also relatively inexpensive to manufacture. Apart from its relative inexpensiveness, polyurethane may be injection molded. The advantages of having sealing ring 32 injection molded as opposed to compression molded, such as is the case with conventional O-rings, is that it does not have seams or weak spots formed thereon. Also, it has been determined that polyurethane permits use of bearing rings 34 as the back-up rings. Sinch there are no seams or weak spots formed in the sealing ring 32 by injection molding a correspondingly stronger sealing ring is provided which serves to increase its useful life. Consequently, a stronger and even less expensive sealing ring can be easily fabricated.

By way of specific example, and not limitation, it has been determined that polyurethane sealing ring 32 would perform very suitably it it had a hardness in the range of from about 30 to 100 durometer Shore A. This chosen hardness range defines a material which can create a high enough radial load when squeezed in piston groove 20 to provide good sealing and wiping actions at lower pressures, such as up to 1,000 psi. Above the 1,000 psi range, polyurethane provides sealing ring 32 with a certain rigidity so as not to loosen or distort the ring's original geometrical shape, and also tends to avoid extrusion into gap 44. Noticeably improved sealing and wear performance of the sealing ring 32 resulted whenever it had a hardness in the range from about 70 to 95 durometer Shore A.

It should be mentioned that the present invention envisions sealing ring 32 being made from a relatively hard polyurethane elastomer and as being unique in its application as described in this invention. It is certainly within the spirit and scope of this invention that other equivalent types of materials may be used. As can be fully recognized from the foregoing description, by reason of the sealing ring 32 having an enlarged cross-sectional area and being made of polyurethane, such sealing ring is able to provide an effective long-wearing seal, especially under typical adverse conditions wherein high fluid pressures of 5,000 psi exist and cylinders have relatively large clearances with respect to the piston.

In regard to each of the bearing rings 34, it will be noted that the primary sealing ring 32 is generally centrally and slidably disposed therebetween. By having the sealing ring and bearing rings 34 movable relative to each other, as opposed to being bonded together, internal stresses are eliminated. Thus, the properties of each of the components can be fully utilized to provide an improved sealing assembly. Essentially described, each of the bearing rings 34 is comprised, in integral combination, of a bearing section means 46, and support section means 48. The bearing section means 46 is defined by a generally annular bearing flange 50. As more clearly depicted in FIG. 1, the annular bearing flange 50 rests upon the external periphery of annular shoulder 24. The outward end of flange 50 is adapted to abut end surface 28. The bearing flange 50 acts to align the moving piston 12 within cylinder 14, and to eliminate or at least minimize radial play. Moreover, bearing flange 50 acts as the piston bearing and facilitates the prevention of the sealing ring wedging in the gap 44. By this particular arrangement, there is less likelihood of damage to and an improved operation of the piston seal 32 and bearing rings 34. In accordance with this invention, the bearing rings 34 are formed from a suitable type of relatively hard wear-resistant material having low friction, such as plastic. The material of the bearing rings 34 is harder than the deformable elastomeric polyurethane sealing ring 32. It has been determined through experimentation that if the material of bearing ring 34 has a hardness in the range of from about Rockwell R-31 to R-118, and possesses compressive strength in the range of from approximately 15,000 to 25,000 psi, a particularly long and satisfactory bearing ring was thus obtained. It should be mentioned, of course, that while the above hardness range is set forth, other hardness ranges may also be utilized without departing from the spirit and scope of this invention. Additionally, other material besides plastics, having similar hardnesses and wear characteristics may be used. With such relative hardness, bearing rings 34 will remain in the same geometrical configuration. As will be presently explained, this feature tends to minimize extrusion of sealing ring 32. The bearing rings 34 are split as at 52 to facilitate their installation into piston seal groove 20.

Support section means 48 is disposed inwardly of bearing flange 50 and is adapted to engage section 22 and abutment surface 30. The support section means 48 is arranged to cooperate with the lateral side surface 40 of sealing ring 32, in a manner to be presently described, and includes concave surface means 54. In the embodiment being illustrated, surface means 54 is defined by a continuous, generally annular, dovetailed groove 56. Groove 56 is, in turn, comprised of a central and generally flat surface 58 and at opposite ends thereof a pair of radially spaced inner and outer inclined dovetail sections 60. It will be readily appreciated that dovetail groove 56 is a generally concave receptacle. Dovetail groove 56 is constructed to that flat surface 58 will contact flat surface 40, and inclined surfaces 60 will contact inner and outer peripheral sealing surfaces 36 and 38, respectively. It will be appreciated, of course, that surface means 54 may be formed such that it has other types of generally concave configurations so long as such configurations at least partially conform to the lateral side surfaces of sealing ring 32 to prevent extrusion and twisting of such ring. For instance, concave surface means 54 may be defined by any kind of replacement curve or radius. It should be understood, however, that, while a generally curved concave surface provides improved results consistent with this invention, it has been determined that dovetailed grooves 56 in conjunction with a sealing ring 32 having flat side surfaces 40, as previously described, are extremely effective in preventing radial thrust and the attendant disadvantages associated therewith.

As aforementioned, bearing rings 34 are harder than the polyurethane sealing ring 32. By reason of the dovetail groove 56 and the softer sealing ring 32, the latter is relatively pushed away from gap 44. Moreover, inclined surfaces 60 of the dovetail groove 56 serve as deflectors or slides for sealing ring 32. Accordingly, extrusion of the sealing ring 32 is prevented. Moreover, the inclined surfaces 60 have a generally symmetrical configuration. Thus, the forces created on the outside of seal 32 will occur on the inside of the seal with the same force; but, with a vector in the opposite direction resulting from the greater circumference. As a result, most internal forces in the sealing ring 32 and bearing rings 34 are self-compensating. The dovetailed inclined surfaces 60 also extend into the seal area with a tendency to lift sealing ring 32 from contact with cylinder wall 16. Consequently, there is a reduction in the radial forces applied on the sealing surface. Also, there is a reduction in contact area between seal and cylinder. As a further result friction and wear are correspondingly diminished.

To provide balanced grooves, the radially inner inclined surface 60 adjacent the reduced diameter portion 22 is longer in dimension than the top or outer inclined surface 60, but is arranged such that forces on the seal are the same but opposite in direction. The end results of such balanced grooves provide sealing ring 32 and bearing rings 34 that float and whereby radial thrust is mostly compensated. In addition, the length of the lower inclined surface 60 can be adjusted so long as such adjustment tends to minimize radial thrust. Also the arrangement of the dovetail groove 56 and, in particular, the flat surfaces 58 thereof and the uniquely formed sealing ring 32 having flat surfaces 40 serve to prevent twisting of the sealing ring.

After having thus described the above organizational components of the respective elements forming the novel and improved seal assembly 10 of the present invention, it is believed that the operation thereof is self-evident. However, in order to briefly supplement such description, it will be understood that whenever the piston 12 is pressurized to move leftwardly, as seen in FIG. 1, the sealing ring 32, under the influence of the axial force generated by the fluid pressure, will be forced in an axial direction against the leftmost bearing ring 34 while the rightmost bearing ring 34 on the high pressure side will float or idle.

By virtue of the sealing ring 32 being made of polyurethane, it will have a higher shear modulus than compared to rubber at the same hardness and does not show large variations with temperature over a normal operating range of temperatures. In addition, polyurethane has significantly more resistance to tearing and better abrasion resistance than conventional elastomers such as rubber and nitrile material. Since sealing ring 32 has a cross-sectional diameter approximately twice as great as a conventional O-ring having a corresponding inside diameter, it will have a vast material reservoir to replace whatever small amount of material which might be removed through abrasion or nibbling. Such sealing ring 32 is able to satisfactorily perform under situations with relatively large interference and clearance dimensions, as compared to standard O-rings.

As previously noted, bearing rings 34 are harder than the polyurethane sealing ring. By this particular arrangement, the leftmost bearing ring 34 will interact with sealing ring 32 and deflect and deform the latter away from gap 44. In particular, the outer inclined dovetail surface 60 acts to prevent the sealing ring 32 from entering radial gap 44 by acting as a deflector, thus preventing extrusion. The forces created on the outside of sealing ring 32 will occur on the inside thereof at the same force; however, the force vectors are in the opposite direction. Therefore, most internal forces in the bearing rings 34 and sealing rings 32 are self-compensating. As also previously noted, dovetail sections of the bearing extend into the seal area with a tendency to lift seal 32 from engagement with cylinder wall 16. Consequently, radial forces and contact area are reduced which correspondingly results in reduction of friction and wear. Moreover, the radial thrust is minimized or eliminated by reason of the dovetail grooves 56 interacting with the flat side surfaces 40.

Of course, since all three components are axially slidably positioned with respect to each other, whenever the piston 12 is powered in the opposite direction of movement, the bearing ring 34 which was formerly floating on the high pressure side of the piston will interact with sealing ring 32 on what is now the low pressure side of the piston. It will be understood that during such opposite linear movement the bearing ring 34 which was interacting with the sealing ring 32 would float and idle on what is now the high pressure side.

As can be appreciated with the foregoing description, through the use of sealing assembly 10 including oversized polyurethane sealing ring 32 and the uniquely formed bearing rings 34, there is provided a simple construction in which long seal life without extrusion or rolling of the sealing ring is obtained and only requires relatively few sealing components. The seal assembly is able to separate the sealing, supporting and bearing functions such that no internal stresses can otherwise occur which might have a tendency to limit full utilization of the materials with their different properties. Consequently, each one of the elements are able to provide for their optimum sealing performance. Aside from the foregoing advantages, the present seal assembly facilitates rather easy installation and replacement thereof. Such sealing assembly can be effectively utilized to provide optimum sealing performance in high pressure situations, as for example, above 5,000 psi, wherein there is relatively large interference (e.g., 15 to 25 thousandths of an inch) between seal and cylinder wall. As noted, such interference is larger than the customary 1 to 5 thousandths of an inch for standard rubber O-rings. Moreover, the seal by virtue of its unique shape can easily accommodate the enlarged clearances resulting, in part, from breathing and thermal expansion which enlarged clearances would have caused the conventional O-rings to fail. Additionally, the polyurethane primary sealing ring is unique as used in the arrangement of this invention and provides significant improvement over heretofore known materials used in similar situations.

The preferred polyurethane or other sealing rings of this invention will generally have physical properties within or close to the following approximate range of values depending upon the particular Shore A Hardness.

| Hardness Shore A | Ultimate Tensile Strength psi | Elongation At Break % | 100% Elongation Modulus psi | 200% Elongation Modulus psi | 300% Modulus psi |
|---|---|---|---|---|---|
| 70 | 5,900 | 500 | 565 | 1,000 | 1,770 |
| 95 | 6,200 | 450 | 1,800 | 2,600 | 3,400 |

| Hardness Shore A | Tear Strength Nicked pli | Abrasion Loss mm³ | Compressive Strength at 20 Deflections, Shape Factor 1 | Sheer Stress at Deflections d/t = .25 |
|---|---|---|---|---|
| 70 | 360 | 25 | 550 | 125 |
| 92 | 480 | 35 | 1,500 (Shore A = 90) | 325 (Shore A = 90) |

In addition, the dovetailed grooves formed on the bearing rings additionally serve to reduce seal friction and, hence, correspondingly increase seal life. By the foregoing cooperation between the flats on the sealing ring and dovetail groove, the radial thrust is compensated for.

It is not intended to limit the present invention to that of the embodiment described above but, on the contrary, it is intended to encompass all other embodiments, alternatives, and modifications which are consistent with the present invention and which are intended to be covered by the appended claims.

What is claimed is:

1. A seal assembly for use on a piston having a piston seal groove with spaced shoulders formed therein comprising a deformable sealing ring adapted to be maintained in the groove and having inner and outer peripheral sealing portions, and side surfaces, said sealing ring being comprised of a homogeneous thermosetting elastomeric material having a relatively high shear modulus and being wear, tear, and abrasion resistant; and a pair of unitary bearing means, each of which is juxtaposed opposite said side surfaces of said sealing ring and being made of a wear-resistant material which is harder than said material of said sealing ring, each of said bearing means includes bearing section means, and support section means, said bearing section means being adapted to be seated on a corresponding shoulder formed in the piston groove for providing a bearing support for said seal assembly, and said support section means contacting said sealing ring and including generally concave surface means which generally conform to at least portions of said side surfaces of said sealing ring for preventing extrusion and twisting of said sealing ring.

2. A seal assembly for use on a piston having a piston seal groove with spaced shoulders formed therein comprising a deformable sealing ring adapted to be maintained in the groove and having inner and outer peripheral sealing portions, and side surfaces, said sealing ring being comprised of a homogeneous thermosetting polyurethane elastomeric material having a relatively high shear modulus and being wear, tear and abrasion resistant; said sealing ring having a cross-sectional diameter which is about twice the cross-sectional diameter for a standard O-ring having the same inner diameter as said sealing ring, and a pair of unitary bearing means, each of which is juxtaposed opposite said side surfaces of said sealing ring and being made of a wear-resistant material which is harder than said material of said sealing ring, each of said bearing means including bearing section means, and support section means, said bearing section means being adapted to be seated on a corresponding shoulder formed in the piston groove for providing a bearing support for said seal assembly, and said support section means contacting said sealing ring and including generally concave surface means which generally conform to at least portions of said side surfaces of said sealing ring for preventing extrusion and twisting of said sealing ring.

3. A seal assembly as set forth in claim 2 in which said polyurethane sealing ring has a hardness in the range of from about 30 to 100 durometer Shore A.

4. A seal assembly as set forth in claim 2 in which said polyurethane sealing ring has a hardness in the range of from about 70 to 95 durometer Shore A.

5. A seal assembly as set forth in claim 3 in which each of said bearing means has a hardness in the range of from about R-31 to R-118 and a compressive strength in the range of 15,000 to 25,000 psi.

6. A seal assembly as set forth in claim 4 in which each of said bearing means has a hardness in the range of from about R-31 to R-118 and a compressive strength in the range of 15,000 to 25,000 psi.

7. A seal assembly for use on a piston having a piston seal groove with spaced shoulders formed therein comprising a deformable sealing ring adapted to be maintained in the groove and having generally circular and symmetrical inner and outer peripheral sealing portions, and generally flat and parallel side surfaces which are arranged at about right angles to a horizontal axis extending through a cross-sectional area of said sealing ring, said sealing ring being made from a thermosetting polyurethane elastomeric material having a relatively high shear modulus in comparison to rubber at the same hardness and being wear, tear, and abrasion resistant, said sealing ring having a cross-sectional diameter which is about twice the size of the cross-sectional diameter for a standard O-ring having the same inner diameter as said sealing ring; and a pair of unitary bearing means, each of which is juxtaposed opposite said slide surfaces of said sealing ring and being made of a wear-resistant material which is harder than said material of said sealing ring, each of said bearing means including bearing section means, and support section means, said bearing section means being adapted to be seated on a corresponding shoulder formed in the piston groove for providing a bearing support for said seal assembly, and said support section means contacting said sealing ring and including generally concave surface means which generally conform to at least portions of said flat side surfaces of said sealing ring for preventing extrusion and twisting of said sealing ring.

8. A seal assembly as set forth in claim 7 in which each of said concave surface means is defined by a continuous and generally annular dovetail shaped groove which is adapted to contact the opposed lateral flat sides of said sealing ring.

9. A seal assembly as set forth in claim 8 in which said dovetail groove is formed by a flat portion which is adapted to contact said flat side surface, and a pair of radially inner and outer dovetail inclined surfaces which are adapted to engage said inner and outer sealing portions, respectively.

10. A seal assembly as set forth in claim 9 in which said inner radially inclined surface has a length which exceeds the dimension of said outer radially inclined surface.

11. A seal assembly as set forth in claim 10 in which said polyurethane sealing ring has a hardness in the range of from about 30 to 100 durometer Shore A.

12. A seal assembly as set forth in claim 11 in which each of said bearing means has a hardness in the range of from about R-31 to R-118 and a compressive strength in the range of 15,000 to 25,000 psi.

* * * * *

UNITED STATES PATENT OFFICE
CERTIFICATE OF CORRECTION

Patent No. 4,052,112          Dated  October 4, 1977

Inventor(s) Klaus Faber

It is certified that error appears in the above-identified patent and that said Letters Patent are hereby corrected as shown below:

On the first page after [73] Assignee: where it now reads "Disogrin Industries, Inc.," it should read --Disogrin Industries Corporation--.

At Column 1, line 22 "fluid basically" should read --fluid cylinder basically--.

At Column 3, line 57 "known known" should read --known kind--.

At Column 5, line 63 "contingous" should read --contiguous--.

At Column 7, line 61 "Sinch there" should read --Since there--.

At Column 8, line 1 "it it had" should read --if it had--.

At Column 9, line 17 "constructed to that" should read --constructed so that--.

At Column 11, line 37 "20 deflections" should read --20% deflection--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks